United States Patent Office 3,647,915
Patented Mar. 7, 1972

3,647,915
ETHYLENE OLIGOMERIZATION
Ronald S. Bauer, Orinda, Peter W. Glockner, Alameda, Wilhelm Keim, Berkeley, and Ronald F. Mason, Mill Valley, Calif., assignors to Shell Oil Company, New York, N.Y.
No Drawing. Filed Nov. 4, 1969, Ser. No. 874,059
Int. Cl. C07c 3/10
U.S. Cl. 260—683.15 D        10 Claims

ABSTRACT OF THE DISCLOSURE

Ethylene is oligomerized to an oligomeric product mixture of high linearity in the presence of a nickel chelate of a bidentate ligand having a tertiary organophosphine moiety and a carbamyl or aryl-substituted carbamyl group substituted on a carbon atom attached directly to the phosphorous atom of the organophosphine moiety.

BACKGROUND OF THE INVENTION

A variety of polymerization catalysts, both homogeneous and heterogeneous, has been utilized to convert ethylene into olefinic products of higher molecular weight, e.g., to dimer and trimer as well as higher oligomers and polymers. However, the character and relative proportions of the product mixture components are greatly dependent upon the particular catalyst and reaction conditions employed.

SUMMARY OF THE INVENTION

It has now been found that an improved process of oligomerizing ethylene is obtained through the use of nickel chelate of a chelating ligand having a tertiary organophosphine moiety and carbamyl, N-arylcarbamyl or a N,N-diarylcarbamyl group substituted on a carbon atom attached directly to the phosphorous atom of the organophosphine moiety. The process is characterized by an ethylene conversion at moderate temperature to a product mixture containing oligomeric products, e.g., dimers, trimer, tetramer and higher oligomers, which are highly linear in character and predominantly alpha-olefins.

DESCRIPTION OF THE PREFERRED EMBODIMENTS

The catalyst

The nickel compound employed as catalyst for the oligomerization process comprises an atom of nickel chelated with a chelating ligand having a tertiary organophosphine moiety and a carbamyl, N-arylcarbamyl or N,N-diarylcarbamyl group substituted on a carbon atom attached directly to the phosphorous atom of the organophosphine moiety. Although it is not desired to be bound by any particular theory, it appears likely that the catalyst molecule undergoes chemical transformation during the course of the oligomerization reaction possibly involving coordination and/or bonding of ethylene to the nickel moiety. However, it appears likely that the phosphorus-containing chelating ligand remains complexed and/or chemically bonded to the nickel moiety during the course of the oligomerization reaction and that this complex of the nickel and the chelating ligand is the effective catalytic species of the oligomerization process. In any event, the phosphorus-containing chelating ligand is an essential component of the catalyst and provided the nickel catalyst contains the required phosphorus-containing ligand, the nickel catalyst may be complexed with a variety of additional organic complexing ligands.

Generally, the catalyst as provided to the reaction mixture comprises an atom of nickel complexed or chemically bonded to the phosphorus-containing chelating ligand and sufficient organic complexing ligands to satisfy the coordination number of the nickel atom, which coordination number is preferably four. The phosphorus-containing ligand is a tertiary organophosphine compound having a carbamyl, N-aryl or N,N-diarylcarbamyl group substituted on a carbon atom attached directly to the phosphorus atom and generally has from 4 to 100 carbon atoms but preferably from 4 to 60 carbon atoms. A suitable class of tertiary organophosphine chelating ligands is represented by the Formula I:

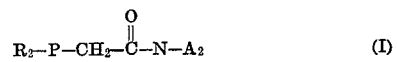

wherein A independently is hydrogen or an aromatic group of up to 10 carbon atoms, R independently is a monovalent organo group, with the proviso the R groups may together with the phosphorus atom form a mono- or bicyclic heterocyclic phosphine having from 5 to 7 carbon atoms in each ring thereof.

Suitable aromatic A groups are hydrocarbyl aromatic groups such as naphthyl, phenyl, tolyl, xylyl, 4-ethylphenyl, 2,4-diethylphenyl, 4-isopropylphenyl and 4-t-butylphenyl. Other suitable aromatic A groups are substituted-aromatic groups containing in addition to atoms of carbon and hydrogen other atoms such as oxygen and halogen, particularly halogen of atomic number of from 9 to 53 inclusive, i.e., fluorine, chlorine, bromine, or iodine, which additional atoms are present in functional groups such as alkoxy, carboalkoxy, alkanoyloxy, halo or trihalomethyl and like groups having no active hydrogen atoms. Illustrative substituted-aromatic A groups are therefore 4-methoxyphenyl, 3-carbomethoxyphenyl, 4-acetoxyphenyl, 3,5-dichlorophenyl, 4-bromophenyl and 4-trichloromethylphenyl.

The R group is an organo group of from 1 to 20 carbon atoms, preferably from 1 to 10 carbon atoms, and is preferably free from acetylenic unsaturation. R is therefore suitably saturated aliphatic, i.e., acyclic saturated aliphatic as well as saturated cycloaliphatic; alkenyl, i.e., acyclic alkenyl as well as cycloalkenyl, or is aromatic, preferably mononuclear aromatic, and is hydrocarbyl group containing only atoms of carbon and hydrogen or is substituted-hydrocarbyl group containing in addition to atoms of carbon and hydrogen other atoms such as oxygen, sulfur, nitrogen and halogen, particularly halogen of atomic number of from 9 to 53 inclusive, i.e., fluorine, chlorine, bromine, or iodine, which additional atoms are present in functional groups such as alkoxy, aryloxy, carboalkoxy, alkanoyloxy, halo, trihalomethyl, cyano, sulfonylalkyl and like groups having no active hydrogen atoms. The R groups are preferably hydrocarbyl containing only the atoms of hydrogen and carbon. Whenever the R groups contain functional groups, it is preferred that any carbon atoms attached directly to the phosphorus atom be free of functional groups, i.e., any functional groups are not substituted on a carbon atom attached directly to the phosphorus atom.

Illustrative of suitable R groups are hydrocarbon alkyl R groups such as methyl, ethyl, propyl, isobutyl, lauryl, stearyl, cyclohexyl and cyclopentyl, hydrocarbon alkenyl R groups such as butenyl, hexenyl, cyclohexenyl; alkyl or alkenyl groups having aromatic substituents such as benzyl, phenylcyclohexyl, and phenylbutenyl; and substituted-hydrocarbyl R groups such as 4-bromohexyl, 4-carbethoxybutyl, 3-cyanopropyl, 4-chlorocyclohexyl and 4-acetoxybutenyl. Aromatic R groups are exemplified by hydrocarbyl aromatic groups such as phenyl, tolyl, xylyl, p-ethylphenyl, and substituted-hydrocarbyl aromatic groups such as p-methoxyphenyl, m-chlorophenyl, m-trifluoromethylphenyl, p-propoxyphenyl, p-cyanophenyl, o-acetoxyphenyl and m-methylsulfonylphenyl.

Illustrative ligands of Formula I are tertiary organophosphines such as dibutyl(carbamylmethyl)phosphine,
diphenyl(N-phenylcarbamylmethyl)phosphine,
di-p-chlorophenyl(N,N-diphenylcarbamylmethyl)phosphine,
dimethyl(N,N-di-p-acetoxyphenylcarbamylmethyl)phosphine, and
di-p-cyanophenyl(N,N-diphenylcarbamylmethyl)phosphine.

Illustrative cyclic phosphines of Formula I wherein the R groups are joined to form heterocyclic rings are monocyclic tertiary phosphines such as 5-carbamylmethyl-5-phosphacyclopentane,
6-(N-phenyl-carbamylmethyl)-6-phosphacyclohexane,
7-(N,N-di-p-chlorophenylcarbamylmethyl)-7-phosphacycloheptane, and bicyclic tertiary phosphines such as 8-(N-phenyl-N-methoxyphenylcarbamylmethyl)-8-phosphabicyclo(3.2.1)octane,
8-(N,N-diphenylcarbamylmethyl)-8-phosphabicyclo-(3.2.1)octane,
9-carbamylmethyl-9-phosphabicyclo(4.2.1)nonane,
9-(N,N-diphenylcarbamylmethyl)-9-phosphabicyclo-(3.3.1)nonane and
9-(N-phenylcarbamylmethyl)-9-phosphabicyclo(4.2.1) nonane.

Organophosphine ligands of Formula I wherein both A groups are aromatic groups are preferred over organophosphines ligands of formula wherein one or both A groups are hydrogens. Particularly preferred tertiary organophosphines are those wherein both R groups and both A groups are hydrocarbyl.

In terms of the organophosphine ligands of Formula I the nickel catalyst may be represented by the Formula II:

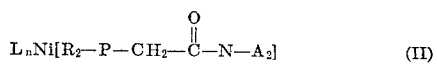

wherein R and A have the same significance as defined in Formula I, L is an organic complexing ligand and $n$ is one or two. It is to be understood that the nickel catalyst as depicted in Formula II represents only the emperical composition of the nickel catalyst and the precise nature of the bonding between the organophosphine ligand and the nickel moiety is not definitely known. However, it is considered likely that the nickel is in a low valence state, e.g., zero-valent or mono-valent nickel.

The organic complexing ligand L is any ligand other than the required organophosphine ligand which organic ligand is complexed to the nickel atom so as to satisfy the coordination number of the nickel atom. In general, organic complexing ligands such as carbon monoxide, organoarsines, organostibines, organobismuthines, and like non-ionic organic ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. A particularly preferred class of olefinically unsaturated compounds are olefins of from 2 to 12 carbon atoms and represented by the Formula III:

wherein R′ and R″ independently is hydrogen, alkyl, cycloalkyl, alkenyl, cycloalkenyl, aralkyl, aryl or alkaryl of up to 8 carbon atoms with the proviso that the R′ and R″ groups may together form a divalent aliphatic moiety of from 2 to 10 carbon atoms and of up to three additional olefinic double bonds as the sole carbon-carbon unsaturation.

Illustrative olefins of Formula III therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclooctatetraene, and cyclododecatriene.

Illustrative nickel catalysts of Formula II are therefore diethylene-diphenyl(carbamylmethyl)phosphine-nickel,
cyclooctadiene-dibutyl-(N,N-diphenylcarbamylmethyl) phosphine-nickel,
butadiene-di-p-chlorophenyl(N-phenylcarbamylmethyl) phosphine-nickel,
cyclooctadiene-diphenyl(N,N-diphenyl(N,N-diphenylcarbamylmethyl)phosphine nickel,
cyclooctatraene[9-N,N-di-p-bromophenylcarbamylmethyl-9-phosphabicyclo(3.3.1)nonane]-nickel, and
bis-2-butene-[9-N,N-diphenylcarbamylmethyl-9-phosphabicyclo[4.2.1]nonane]-nickel.

The nickel catalyst employed in the oligomerization process is prepared by a variety of methods. In a preferred method, the catalyst composition is prepared by contacting an olefinic-nickel compound and the bidentate phosphine ligand. One class of olefinic nickel compounds useful as catalyst precursors are zero-valent nickel compounds represented by the Formula IV:

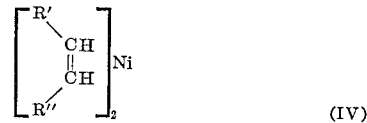

wherein R′CHCHR″ has the same significance as defined in Formula III. Illustrative nickel compounds of Formula IV are therefore bis(cyclooctadiene)-nickel(O), bis(cyclooctatetraene)nickel(O), and bis(1,3,7-octatriene)nickel-(O).

Another class of olefinic nickel compounds useful as catalyst precursors is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula V:

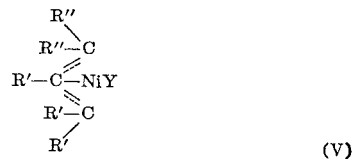

wherein R′ and R″ independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R″ together with one R′ may form a divalent alkylene moiety of 2 to 10 carbon atoms, preferably 2 to 5, and of up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula V are π-allylnickel chloride, π-allylnickel bromide, π-crotylnickel chloride, π-methylallylnickel chloride, π-ethylallylnickel chloride, π-cyclopentenylnickel bromide, π-cyclooctenylnickel chloride, π-cyclooctadienylnickel chloride, π-cinnamylnickel bromide, π-phenylallylnickel chloride, π-cyclohexenylnickel bromide, π-cyclododecenylnickel chloride and π-cyclododecatrienylnickel chloride. Although the complex of the above Formula V and other π-allyl nickel halides probably exist independently in the form of a dimer, for convenience and simplicity the π-allyl nickel halides are herein depicted and named as monomeric species.

Other suitable π-allyl nickel compounds of Formula V are π-allylnickel acetate, π-methylallylnickel propionate, π-cyclooctenylnickel octoate, π-allylnickel methoxyate and π-allylnickel ethoxyate.

Another suitable type of π-allyl nickel compounds useful as catalyst precursors is bis-π-allyl nickel compounds represented by the Formula VI:

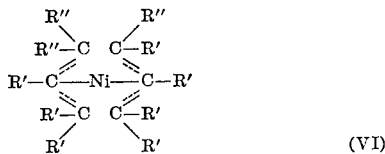

(VI)

wherein R″, R′ and the dotted line designation have the same significance as defined in Formula V, with the proviso that R″ together with one R′ of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VI are bis-π-allyl nickel, bis-π-methallyl nickel, bis-π-cinnamylnickel, bis-π-octadienylnickel, bis-π-cyclohexenylnickel, π-allyl-π-methallylnickel, and bis-π-cyclooctatrienylnickel.

The olefinic-nickel catalyst component and the phosphorus-containing ligand catalyst component are generally contacted in substantially equimolar amounts, e.g., the molar ratio of olefinic-nickel compound to the ligand varies from about 1.2:1 to 1:1.2, but is preferably about 1:1. The catalyst composition is suitably preformed by contacting the catalyst precursors in an inert diluent, e.g., diluents employed for the polymerization process. In another modification, however, the catalyst precursor components are contacted in the presence of the ethylene reactant during the initiation of the oligomerization process. By any modification, the catalyst precursor components are contacted at temperatures from about 25° C. to 100° C.

The nickel catalyst is suitably employed as an unsupported material. In certain modifications, however, it has been found desirable to employ the nickel catalyst supported on inorganic, solid catalyst carriers which are normally solid under reaction conditions and are heterogeneous, i.e., are substantially insoluble in the disproportionation reaction medium. Illustrative of suitable inorganic, solid catalyst carriers are inorganic acidic oxides such as alumina and inorganic materials known as siliceous refractory oxides. Suitable siliceous refractory oxides include synthetic components as well as acid treated clay and similar materials such as kieselguhr or crystalline macroreticular aluminosilicates known in the art as molecular sieves. In general, synthetic siliceous catalyst carriers are preferred over naturally occurring materials or molecular sieves, and exemplary synthetic siliceous refractory catalyst carriers include silica-alumina, silica-magnesia, silica-alumina-titania, silica-alumina-zirconia, silica-titania-zirconia, silica-magnesia-alumina and the like.

When the nickel catalyst is supported, the amount of catalyst composition to carrier is not critical. In general, amounts of nickel catalyst from about 0.01% to about 40% by weight, based on the catalyst carrier, are satisfactory, with amounts from about 0.1% to about 20% by weight, calculated on the same basis, being preferred. The nickel catayst is introduced onto the catalyst carrier in any suitable manner. In one modification, the supported catalyst composition is prepared by intimately contacting the pre-formed catalyst and the carrier in an inert diluent, preferably the same inert diluent employed for preparing the nickel catalyst. In another modification, the supported catalyst can be prepared directly by contacting the nickel catalyst precursors in the presence of the catalyst carrier in a suitable inert diluent.

The amount of nickel catalyst employed in the oligomerization process is not critical. In general, amounts of the nickel catalyst of from 0.001% to about 100% by weight based on ethylene are satisfactory with amounts of from about 0.1% to about 25% by weight on the same basis being preferred.

The reaction conditions

The ethylene is contacted with the catalyst precursors components in the liquid phase in the absence or presence of reaction solvent or diluent which is liquid at reaction temperature and pressure. Illustrative organic solvents are aromatic compounds such as benzene, toluene, chlorobenzene and oxygenated hydrocarbons such as dialkyl ketones, e.g., acetone, methyl ethyl ketone and ethyl butyl ketone; cycloalkyl ethers, e.g., dioxane, tetrahydrofuran and tetrahydropyran, acyclic alkyl ethers, e.g., dimethoxyethane, diethylene glycol dimethyl ether and dibutyl ether. Other suitable organic solvents include nitriles such as acetonitrile and propionitrile, dialkylamides such as dimethylformamide; and dialkylsulfoxides such as dimethylsulfoxide. Still other suitable solvents comprise water or water containing a portion of polar organic co-solvent. Suitable mixtures of water and a polar organic co-solvent vary by volume, from about 40% co-solvent to 80% co-solvent and from about 20% water to 80% water. Alkanes and alkenes, including cycloalkanes and cycloalkenes, of from 5 to 20 carbon atoms such as butene-1, isopentane, pentene, cyclopentane, cyclohexane, isohexane, heptane, isooctane, decane, decene-1, dodecane, hexadecene and eicosane are also suitable reaction solvents. In many modifications of the oligometrization process, a portion of the oligomeric product suitably serves as the reaction diluent and no added diluent is employed. When diluent is utilized, however, amounts up to about 30 moles of diluent per mole of ethylene are satisfactory. Preferred reaction diluents and solvents are aromatic hydrocarbons, lower dialkylsulfoxides, lower alkyl nitriles, alkanes, or mixtures thereof.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 10° C. to 250° C., but preferably from 30° C. to 100° C. The reaction is conducted at or above atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 p.s.i.g. being preferred.

The products are separated and recovered from the reaction mixture by conventional methods such as fractional distillation, selective extraction, filtration, adsorption and the like. The reaction diluent, catalyst and any unreacted ethylene are recycled for further utilization.

The ethylene oligomer products are materials of established utility and many are chemicals of commerce. The products are converted by conventional "Oxo" processes to aldehydes which are hydrogenated with conventional catalysts to the corresponding alcohols. Alternatively, the product olefins are converted to secondary alcohols by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

To further illustrate the improved process of the invention and the novel catalyst composition therefore, the following examples are provided.

EXAMPLE I

An oligomerization catalyst was prepared by contacting 0.2 g. of bis-1,5-cyclooctadienenickel(O) and 0.14 g. of a mixture of 9-carbamylmethyl-9-phosphabicyclo-(3.3.1)nonane and 3-carbamylmethyl-9-phosphabicyclo-(4.2.1)nonane in 30 ml. of benzene at 25° C. The resulting catalyst solution was then contacted with 11 g. of ethylene in a stirred autoclave. The reaction conditions and results are provided in Table I as Run I.

EXAMPLE II

An oligomerization catalyst was prepared by contacting 0.34 g. of bis-1,5-cyclooctadienenickel(O) and 0.48 g. of diphenyl(N,N-diphenylcarbamylmethyl)phosphine in 60 ml. of benzene at 25° C. The resulting catalyst solution was then contacted with 29 g. of ethylene in a stirred autoclave. The reaction conditions and results are provided in Table I as Run II.

EXAMPLE III

An oligomerization catalyst was prepared by contacting 0.3 g. of bis-1,5-cyclooctadienenickel(O) and 0.34 g. of diphenyl(N,N-diphenylcarbamyl)phosphine in 25 ml. of n-heptane at about 25° C. The resulting catalyst mixture was then contacted with 11 g. of ethylene in a stirred autoclave. The reaction conditions and results are provided in Table I as Run III.

EXAMPLE IV

A supported oligomerization catalyst was prepared by contacting a solution of 0.3 g. of bis-1,5-cyclooctadienenickel(O) and 0.34 g. of diphenyl(N,N-diphenylcarbamylmethyl)phosphine in benzene with 3 g. of commercial silica having a surface area of 700 m.$^2$/g., filtering the resulting supported catalyst and subsequently washing with additional benzene. A 3 g. sample of the supported catalyst in 25 ml. of benzene was then contacted with 11 g. of ethylene in a stirred autoclave. The reaction conditions and results are provided in Table I as Run IV.

EXAMPLE V

By a procedure similar to that of Example I, an oligomerization catalyst is prepared by contacting substantially equimolar amounts of π-allyl nickel bromide and 9-(N,N - diphenylcarbamylmethyl) - 9 - phosphabicyclo-(3.3.1)nonane in benzene. The resulting catalyst solution is then contacted with ethylene at elevated temperature and pressure to produce a good yield of oligomeric products.

EXAMPLE VI

By a procedure similar to that of Example I, an oligomerization catalyst is prepared by contacting substantially equimolar amounts of bis-π-allylnickel and diethyl(N-phenylcarbamylmethyl)phosphine in benzene. The resulting catalyst solution is then contacted with ethylene at elevated temperature and pressure to produce a good yield of oligomeric products.

TABLE I

| Run No. | I | II | III | IV |
|---|---|---|---|---|
| Support | None | None | None | SiO$_2$ |
| Solvent | (¹) | (¹) | (²) | (¹) |
| Ethylene, g | 11 | 29 | 11 | 11 |
| Reaction conditions: | | | | |
| Time, hours | 15 | 2 | 18 | 18 |
| Temperature, ° C | 70 | 100 | 50 | 46 |
| Ethylene pressure, p.s.i.g | 600 | 600 | 500–700 | 250–450 |
| Ethylene conversion, percent | 73 | 41 | 68 | 73 |
| Gram oligomer product/gram Ni/hour | 10 | 75 | 6.5 | 7.0 |
| Product distribution: | | | | |
| Weight, percent: | | | | |
| C$_4$ | 86 | 6.5 | 17 | 18 |
| C$_6$ | 15 | 7.3 | 8.5 | 9.1 |
| C$_8$ | 14 | 8.9 | 8.5 | 9 |
| C$_{10}$ | 1 | 9.2 | 8.2 | 9.1 |
| C$_{12}$ | | 9.5 | 8.5 | 9 |
| C$_{14}$ | | 9.5 | 8.5 | 8.5 |
| C$_{16}$ | | 8.5 | 8.5 | 8.5 |
| C$_{18}$ | | 8.5 | 8 | 8 |
| C$_{20}^+$ | | 31.1 | 24 | 31 |
| Linearity, percent | >90 | 99.8 | >98 | 99 |
| Terminal olefin, percent | >90 | 99.4 | >96 | 96 |

¹ Benzene.
² Heptane.

EXAMPLE VII

A solution of 0.5 mole of α-chloroacetamide in 300 ml. of 1,2-dimethoxyethane and 0.5 mole of 9-H-9-phosphabicyclo(3.3.1)nonane in about 200 ml. of t-butyltoluene was heated under reflux for about 6 hours. The resulting reaction mixture was allowed to stand for several days at room temperature. The 9-H-9-(carbamylmethyl)bicyclo(3.3.1)nonyl-9-phosphonium chloride which precipitated was filtered and dried under reduced pressure. The crude phosphonium chloride product weighed 53 g. A sample of the crude phosphonium chloride was recrystallized twice from methanol to give product melting at 239–240° C. (dec.).

A 91 g. sample of the crude phosphonium chloride was dissolved in 150 ml. of deaerated water and 50 ml. of methanol and treated with 15.7 g. of sodium hydroxide in 50 ml. of water to give a solid mixture of sodium chloride and 9-(carbamylmethyl)-9-phosphabicyclo(3.3.1)nonane. The solid mixture was filtered, washed with 50 ml. of deaerated water and dried over phosphorus pentoxide in a vacuum oven. The dried mixture was then extracted with benzene in a vapor jacketed Soxhlet extractor. On cooling, the benzene extracts deposited 34 g. of 9-(carbamylmehtyl)-9-phosphabicyclo(3.3.1)nonane, M.P. 129–131° C. (sealed tube). Elemental analysis of a sample recrystallized from acetonitrile gave the following results: Found, percent wt.: C, 61.3; H, 9.1; N, 6.8. Calcd. for C$_{10}$H$_{18}$NOP: C, 60.3; H, 9.1; N, 7.0.

EXAMPLE VIII

By a procedure similar to that of Example VII, a sample of 9-(N,N-diphenylcarbamylmethyl)-9-phosphabicyclo(3.3.1)nonane is prepared by (1) reaction of N,N-diphenyl-α-chloroacetamide and 9 - H - 9 - phosphabicyclo (3.3.1)nonane to produce 9-H-9-(N,N-diphenylcarbamylmethyl)bicyclo(3.3.1)nonyl-9-phosphonium chloride and (2) subsequently neutralizing the phosphonium chloride salt with 1 equivalent of sodium hydroxide to produce the 9 - (N,N-diphenylcarbamylmethyl) - 9 - phosphabicyclo (3.3.1)nonane product.

We claim as our invention:

1. A process of oligomerizing ethylene by contacting in liquid phase at a temperature of about 10° C. to 250° C. in the presence of a catalyst of a nickel complex having one chelating ligand having from 4 to 100 carbon atoms and having one tertiary organophosphine moiety and one carbamyl, N-arylcarbamyl or N,N-diarylcarbamyl group substituted on a carbon atom attached directly to the phosphorus atom of the organophosphine moiety.

2. The process of claim 1 wherein the chelating ligand is represented by the formula

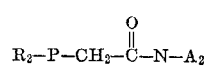

wherein A independently is hydrogen or an aromatic group of up to 10 carbon atoms, and R is a monovalent organo group of 1 to 20 carbon atoms, with the proviso that the R groups may together with the phosphorus atom form a mono or bicyclic heterocyclic phosphine having from 5 to 7 carbon atoms in each ring thereof.

3. The process of claim 2 wherein the catalyst is provided as a nickel chelate represented by the formula

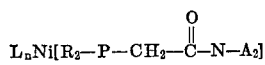

wherein R and A have the same significance as defined in claim 2, L is an olefinically unsaturated ligand and $n$ is 1 or 2.

4. The process of claim 2 wherein the nickel chelate is prepared by contacting in an inert diluent the chelating ligand of the formula

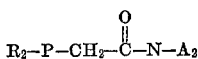

and an olefinic-nickel compound of the formula

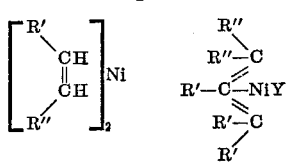

or

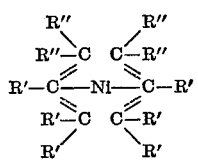

wherein R' and R" independently are hydrogen, alkyl, cycloalkyl, alkenyl, cycloalkenyl, aralkyl, aryl or alkaryl of up to 8 carbon atoms and Y is halogen of atomic number 17 to 35 inclusive, alkoxy or alkanoyloxy of up to 10 carbon atoms with the proviso that one R" together with one R' may form a divalent alkylene moiety 2 to 10 carbon atoms and of up to three additional olefinic double bonds.

5. The process of claim 4 wherein R groups of the chelating ligand are hydrocarbyl.

6. The process of claim 5 wherein A is hydrocarbyl aromatic.

7. The process of claim 6 wherein the chelating ligand is 9-(N,N-diphenylcarbamylmethyl) - 9 - phosphabicyclononane.

8. The process of claim 7 wherein the olefinic-nickel compound is bis-cyclooctadienenickel(O).

9. The process of claim 1 wherein the catalyst is supported on an inorganic oxide support.

10. The process of claim 5 wherein the catalyst is supported on an inorganic oxide catalyst support, the amount of catalyst being of from about 0.1% to about 20% by weight based on catalyst support.

References Cited

UNITED STATES PATENTS

| | | | |
|---|---|---|---|
| 3,536,778 | 10/1970 | Bergem et al. | 260—683.15 |
| 3,379,706 | 4/1968 | Wilke | 260—683.15 X |
| 3,532,765 | 10/1970 | Barnett et al. | 260—683.15 |
| 3,483,269 | 12/1969 | Magoon et al. | 260—683.15 |

PAUL M. COUGHLAN, JR., Primary Examiner

U.S. Cl. X.R.

252—428; 260—429 L, 439 R